United States Patent [19]
Komara

[11] Patent Number: 6,161,024
[45] Date of Patent: Dec. 12, 2000

[54] REDUNDANT BROADBAND MULTI-CARRIER BASE STATION FOR WIRELESS COMMUNICATIONS USING OMNI-DIRECTIONAL OVERLAY ON A TRI-SECTORED WIRELESS SYSTEM

[75] Inventor: Michael A. Komara, Indialantic, Fla.

[73] Assignee: Airnet Communications Corporations, Melbourne, Fla.

[21] Appl. No.: 09/417,589

[22] Filed: Oct. 14, 1999

Related U.S. Application Data

[60] Provisional application No. 60/104,440, Oct. 15, 1998.

[51] Int. Cl.[7] .............................. H04B 1/38; H04M 1/00
[52] U.S. Cl. ....................... 455/562; 455/561; 455/67.1; 455/101
[58] Field of Search .................................. 455/561, 562, 455/101, 102, 103, 132, 446, 8, 9, 25, 67.1, 424

[56] References Cited

U.S. PATENT DOCUMENTS

| | | | |
|---|---|---|---|
| 4,694,484 | 9/1987 | Atkinson et al. | 379/59 |
| 5,353,333 | 10/1994 | Fuentes | 379/59 |
| 5,535,423 | 7/1996 | Dupuy | 455/33.1 |
| 5,548,807 | 8/1996 | Ueda | 455/33.1 |
| 5,579,341 | 11/1996 | Smith et al. | 375/267 |
| 5,615,409 | 3/1997 | Forssen et al. | 455/33.1 |
| 5,742,911 | 4/1998 | Dumbrill et al. | 455/562 |
| 5,861,844 | 1/1999 | Gilmore et al. | 342/374 |
| 5,901,355 | 5/1999 | Doner | 455/447 |
| 5,999,826 | 12/1999 | Whinnett | 455/562 |
| 6,009,130 | 12/1999 | Lurey et al. | 375/347 |
| 6,018,644 | 1/2000 | Minarik | 455/82 |

*Primary Examiner*—Fan Tsang
*Assistant Examiner*—Marceau Milord
*Attorney, Agent, or Firm*—Quarles & Brady LLP

[57] ABSTRACT

A broadband multi-carrier base station for wireless communication, such as cellular telephone or personal communication systems has three sets of broadband transceivers and antennas forming a standard tri-sector or tri-cell coverage pattern. A fourth broadband transceiver coupled to a substantially omni-directional fourth antenna that has a coverage area overlapping the tri-sector or tri-cell coverage pattern. Thus the fourth broadband transceiver and fourth antenna provide redundant communication in the event of a malfunction of one of the other broadband transceivers.

4 Claims, 2 Drawing Sheets

REDUNDANT BROADBAND MULTI-CARRIER BASE STATION FOR WIRELESS COMMUNICATIONS USING OMNI-DIRECTIONAL OVERLAY ON A TRI-SECTORED WIRELESS SYSTEM

This application claims benefit to provisional application 60/104,440 filed Oct. 15, 1998.

BACKGROUND OF THE INVENTION

This invention relates to a wireless communication system having a base station that employs a broadband, multiple carrier digital transceiver, and in particular to providing equipment redundancy in the event a primary transceiver or amplifier fails.

BACKGROUND

In conventional wireless communication services, such as cellular mobile telephone and personal communication systems, communication links between mobile stations and base stations have been created using narrow band radio frequency channels. In an effort to make the best use of the allocated spectrum, the geographic territory is divided into a number of smaller areas called cells. These narrowband radio channels are then allocated to the cells such that the amount of interference is minimal and such that capacity is maximized. Each cell has a tri-sectored base station which derives its name from the transmission pattern produced by three antenna arrays located on the faces of a triangle with each antenna array positioned 120 degrees with respect to the two adjacent arrays. Each antenna array is capable of communicating on all of the radio frequency channels assigned to that base station.

Previously the base station provided a separate transceiver for each radio frequency channel at each antenna array. For example, there are six transceivers required to support two carriers in each of the three sectors. Backup transceivers are often provided in the event one of the primary transceivers fails to operate. The redundancy doubles the number of transceivers required.

An alternative arrangement defined three separate cells projecting in different directions at 120 degree increments from a given base station, in which case, each antenna array is associated with a unique set of radio frequency channels for the related cell. This arrangement also required duplication of the transceivers for full redundancy.

More recently, broadband base stations have been utilized. With this approach, each of the three antenna arrays is coupled to a broadband transceiver that is capable of transmitting and receiving multiple signals throughout the portion of the radio frequency spectrum that contained all the channels assigned to the base station. On the receive side, the broadband transceiver uses a high speed analog-to-digital converter and equipment which makes use of efficient digital filtering algorithms, such as the fast Fourier transform, to separate the incoming signal energy into the desired channels. On the transmit side, this broadband base station implementation includes inverse fast Fourier transformation to combine the individual channel signals. In this manner, relatively compact, inexpensive, and reliable digital integrated circuits can be used to cover the entire channel capacity offered by the broadband base station.

Two techniques have been employed to provide redundancy in the event of failure of a primary broadband transceiver or amplifier. The first utilized three back-up transceivers and amplifiers operating in a standby mode with each back-up transceiver/amplifier associated with a different primary transceiver/amplifier and fixedly connected to one of the three antenna arrays. This was relatively costly as twice the number of transceivers and amplifiers were required. In an attempt to reduce cost, a second technique was derived which utilized only a single back-up transceiver/amplifier that could be switched to the antenna array associated with the malfunctioning primary transceiver or amplifier. Although only four transceivers/amplifiers now were required, three primary ones and one back-up, the switching equipment proved cumbersome and costly. Further, with both techniques, the back-up transceivers and amplifiers served no function while the primary transceivers/amplifiers operated properly.

SUMMARY OF THE INVENTION

The present invention addresses the need for a cost-effective technique for providing redundancy for the transmission equipment of a wireless communication base station.

That base station includes a plurality of broadband transceivers for receiving and transmitting radio frequency signals. A plurality of antennas are each connected to a different one of the plurality of broadband transceivers and amplifiers and have a coverage pattern extending in a different direction from the base station. For example, the plurality of antennas may be configured in a standard tri-sector or tri-cell pattern.

The redundancy is provided by an overlay broadband transceiver/amplifier coupled to an overlay antenna for receiving and transmitting signals on a radio frequency. The overlay antenna has a coverage area extending in a substantially omni-directional pattern from the base station, thereby overlapping coverage patterns from all of the plurality of antenna arrays. The overlay transceiver/amplifier and antenna provide redundant communication in the event of a malfunction of any one of the plurality of broadband transceivers/amplifiers.

DETAILED DESCRIPTION OF THE INVENTION

Figure 1:
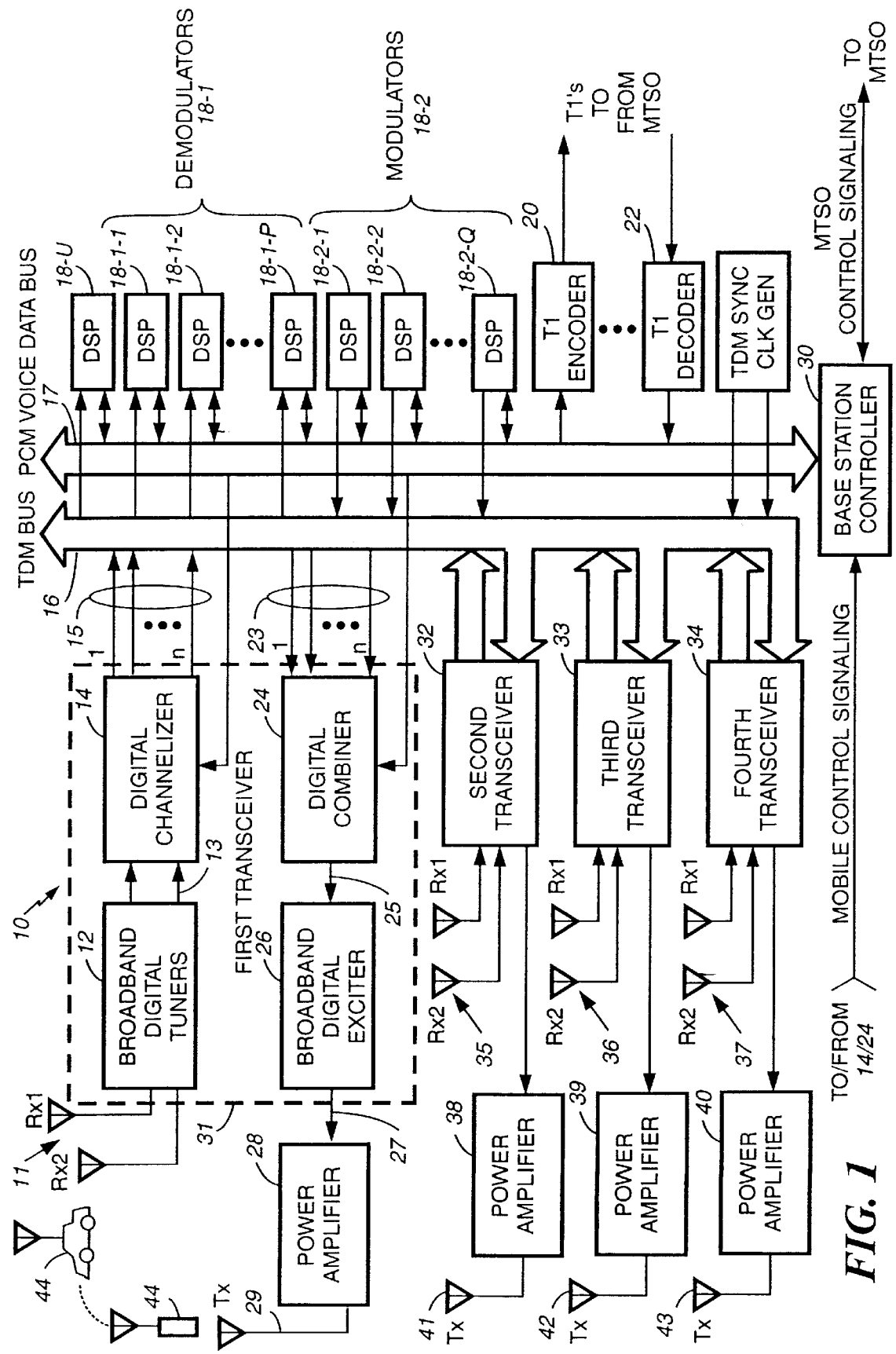
FIG. 1 is a block diagram of an exemplary broadband digital base station for a wireless communication service, such as cellular mobile telephone or personal communication system that incorporates the present invention.

FIG. 1 is a block diagram of a broadband wireless digital base station 10 according to the invention. Briefly, the base station 10 consists of four broadband transceivers 31, 32, 33 and 34 each of which is connected to a time division multiplex (TDM) bus 16 and a PCM voice data bus 17. Each broadband transceiver 31, 32, 33 and 34 is respectively connected to a pair (Rx1 and Rx2) of receive antennas 11, 35, 36 and 37 and via a high power, multi-carrier amplifier 28, 38, 39, and 40, as well as being connected to a transmit (Tx) antenna 29, 41, 42, and 43. A plurality of digital signal processors (DSP's) also are coupled to the TDM and control buses 16. The DSP's are divided into a first group 18-1 which are programmed to operate as demodulators 18-1-1, 18-1-2, . . . 18-1-P and into a second group 18-2 programmed to operate as modulators 18-2-1, 18-2-2, . . . 18-2-Q. A third group of digital signal processors 18-U is presently idle. Also provided in the base station is a transport signal (T1) encoder 20, a T1 decoder 22, a base station controller 30, and a TDM synchronization clock generator 32, all of which are connected to the two buses 16 and 17. The details of the base station are described in U.S. Pat. No. 5,940,384, the description of which is incorporated herein by reference previously issued to AirNet Communications Corp. who is the assignee of the present application.

More particularly, the base station 10 exchanges radio frequency (RF) signals with a number of mobile subscriber terminals (mobile units) 44. The RF carrier signals, having a frequency associated with a given wireless channel, are modulated with voice and/or data signals which are to be coupled to the public switched telephone network (PSTN) by the base station 10. The particular modulation process that is used may be any one of a number of different wireless air interface standards such as the well known Advanced Mobile Phone Service (AMPS), time division multiple access (TDMA) such as IS-54B or IS-136, code division multiple access (CDMA) such as IS-95, frequency hopping TDMA standards such as the European Groupe Speciale Mobile (GSM), personal communication network standards, and the like. Indeed, in a manner that will be described below, the base station 10 may even be configured to simultaneously process RF signals formatted according to more than one such wireless standards at the same time.

Each broadband transceiver 31, 32, 33 and 34 has the same structure with that for the first broadband transceiver 31 being shown in detail. The diversity receive section of the first broadband transceiver 31 includes a two-channel broadband digital tuner 12 which processes the RF signals from the receive antennas 11 and 29 and passes the digitized intermediate frequency (IF) signal to a digital channelizer 14. Specifically, the digital tuner 12 downconverts the RF signal received at the antenna to an intermediate frequency and then performs an analog to digital conversion to produce a digital composite signal 13. Digital tuner 12 is broadband in the sense that it covers a substantial portion of the RF bandwidth available to the wireless service provider who is operating the base station 10. For example, if the air interface implemented by the base station 10 is IS-54B, the broadband digital tuner may downconvert as much as a 12.5 MHz bandwidth in the 800–900 MHz range which contains as many as 416 receive and 416 transmit channel signals, each having an approximately 30 kHz bandwidth.

The digital channelizer 14 implements a channel bank to separate the downconverted composite digital signal 13 to a plurality of n digital channel signals 15. This digital sampled signal then is further filtered to separate it into the individual 30 kHz channel signals. The digital channelizer 14 can thus be considered as a bank of digital filters with each filter having a 30 kHz bandwidth. The digital channelizer 14 may implement the filter bank using any of several conventional filter structures, and no particular digital filter structure is critical to the operation of the invention. However, in one preferred embodiment, the digital channelizer 14 consists of a set of convolutional digital filters and a fast Fourier transform processor. The convolutional digital filters make use of multirate digital filter techniques, such as polyphase or overlap-and-add, to efficiently implement a digital filter bank by grouping samples of the downconverted signal together, multiplying the sample groups by a convolutional function, and then forwarding the samples to the fast Fourier transform processor for conversion into the n individual channel signals. Such filter banks may implemented using any of the techniques as are described in the textbook by R. E. Crochiere and L. R. Rabiner entitled *Multirate Digital Signal Processing,* 1983, Prentice-Hall, Englewood Cliffs, N.J. U.S.A., pages 289–399.

The channelizer 14 provides n individual digital channel signals 15, wherein each of the n outputs represent information in one of the radio frequency channels originated by a mobile subscriber terminal 44. Usually, the channels used for transmitting signals are frequency offset from those used for receiving signals. Thus, in the IS-54B example being described, n is 416, and there are 416 receive and 416 transmit channels implemented by the base station 10 separated by 45 MHz of duplex offset.

These n digital channel signals are then provided over the time division multiplex (TDM) bus 16 to a plurality of digital signal processors (DSP's) 18-1-1, 18-1-2, . . . 18-1-P (collectively referred to as demodulators 18-1). The TDM bus 16 operates as a time division multiplexed cross-bar switch. That is, any one of the n digital channel signals 15 may be connected to any one of the demodulators 18-1 via the TDM bus 16. The exact nature of the timing of the TDM bus 16, that is, the number of time slots available for each frame of data samples output by the digital channelizer 14, and thus the manner in which the n digital channel signals are transferred over the TDM bus 16, changes depending upon the number of channel signals n, as is well known. The base station controller 30, using the VME bus and TDM synchronization clock generator 32, manages access by individual digital channel signals 15 to the TDM bus 16. The PCM voice data bus 17 is any relatively high frequency bus for interconnecting digital processors and components. In this architecture a SCSA (signal computing system architecture) bus is used.

The demodulators 18-1 are each programmed to demodulate each channel signal 15 as specified by the air interface standard supported by the base station 10. There typically is not a one-to-one correspondence between the number of DSP demodulators 18-1 and the number of channel signals, n, provided by the channelizers 14 in each transceiver 31–34. For example, the DSP's may each process a number, such as 24, of digital channel signals 15 at the same time.

The outputs of the demodulators 18-1, representing demodulated voice or data signals, then are forwarded over the VME bus 17 to one of several encoders 20–22. The encoder 20–22, in turn, reformats the demodulated signals as necessary for transmission to a local mobile telephone switching office (MTSO). The demodulated signals may be reformatted according to any one of a number of well-known time multiplex telephone signal transport protocols, such as the so-called T1 span (or E1). The T1 signals are then processed by the MTSO in a known fashion, to ultimately complete a telephone call from the mobile subscriber terminal 44 to a desired destination, such as another telephone subscriber who is connected to the Public Switched Telephone Network (PSTN).

Since each T1 span has a limited capacity, there may be more than one T1 signal necessary to accommodate all of the channels serviced by the base station 10. In the example being discussed, each T1 signal may be formatted to carry up to 96 IS-54B bandwidth-compressed signals to the MTSO, assuming that the demodulated signals remain as compressed audio. Thus, as few as five T1 lines can be used to carry all of the 416 transmit and receive channels. When not all of the channels are busy, however, on as many of the T1 line resources as are necessary are connected to the MTSO, in a manner that will be understood shortly.

In other words, the demodulated signals output by the DSP's 18-1-1 through 18-1-P may each be sub-rate (e.g., sub-DS0 frequency signals) which still contain additional encoding other than the air interface standard, such as impressed by a bandwidth compression scheme, which is not removed by the base station 10. Rather, to minimize the required number of time slots used by the T1 signals, such compression may be removed at the MTSO.

The signal flow on the transmit side of the base station is analogous. Signals are received from the MTSO and provided to the T1 decoder 22, which removes the T1 formatting. The unformatted T1 signals are then coupled to the modulator digital signal processors 18-2 over the PCM voice data bus 17. These DSP's 18-2-1, 18-2-2, . . . , 18-2-Q modulate those signals and present them to the TDM bus 16 from which each signal is coupled via an input for one of the n digital channel signals 23 to a combiner 24 in the appropriate transceiver 31–34. As was true in the receive direction, the TDM bus 16, being a cross-bar switch, permits any one of the modulator DSP's 18-2 to be connected to any channel signal inputs 23 of the four transceivers 31–34.

Although each of the modulators 18-2 typically processes multiple channel signals, each such channel signal generated by the modulator DSP 18-2 typically is assigned one or more unique time slots on the TDM bus 16, with no two channel signals thus occupying the same time slot. Similarly, no two channel signals from the receive section of a transceiver ever occupy the same time slot on the TDM bus 16.

Other DSP's 18-u may be unused at a particular point in time. However, these unused DSP's remain as an available resource to the base station 10, should a new mobile subscriber terminal 44 request access. The manner in which DSP's are allocated at the time of setting up a call will be described in detail below.

The digital combiner 24 in the first transceiver 31 combines signals from the TDM bus 16 to produce a composite intermediate frequency digital signal 25 corresponding to the n channels to be transmitted. The digital combiner 24 then feeds this combined signal to a broadband digital exciter 26, which generates an RF signal 27. This RF signal 27 is amplified by broadband multi-carrier high power amplifier 28 and fed to the transmit antenna 29.

Figure 2:
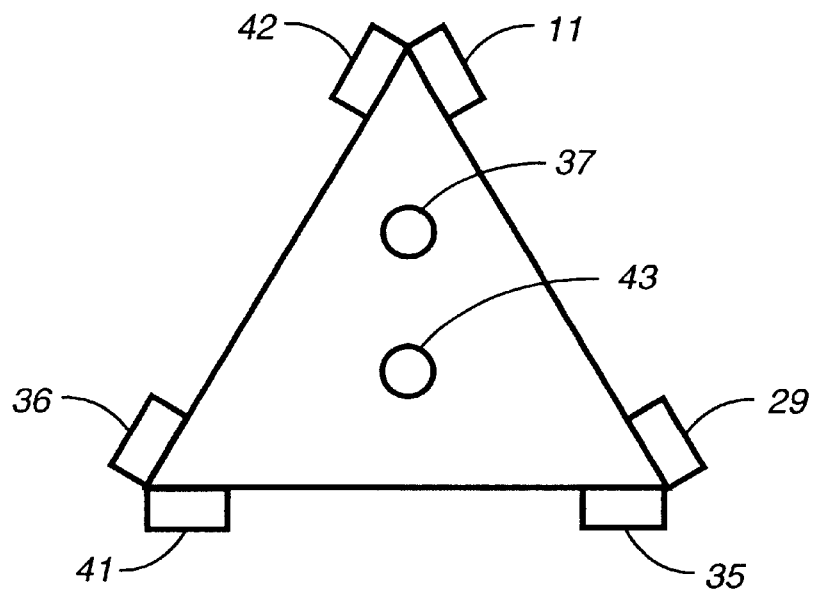
FIG. 2 is a top view of an antenna assembly connected to the base station.

With reference to FIG. 2, the antennas 11, 29, 35, 36, 37, 41, 42, and 43 are mounted on a tower or other elevated structure at substantially the same height in a triangular configuration. The pair of receive and transmit antennas for each of the first, second, and third transceivers 31, 32, and 33 are each positioned on different sides of a triangle. Specifically, the antennas 11 and 29 for the first transceiver 31 are positioned on one facet of the triangle, antennas 35 and 41 for the second transceiver 32 are on a second facet and the pair of antennas 36 and 42 for the third transceiver 33 are on the final facet of the triangular configuration.

Figure 3:
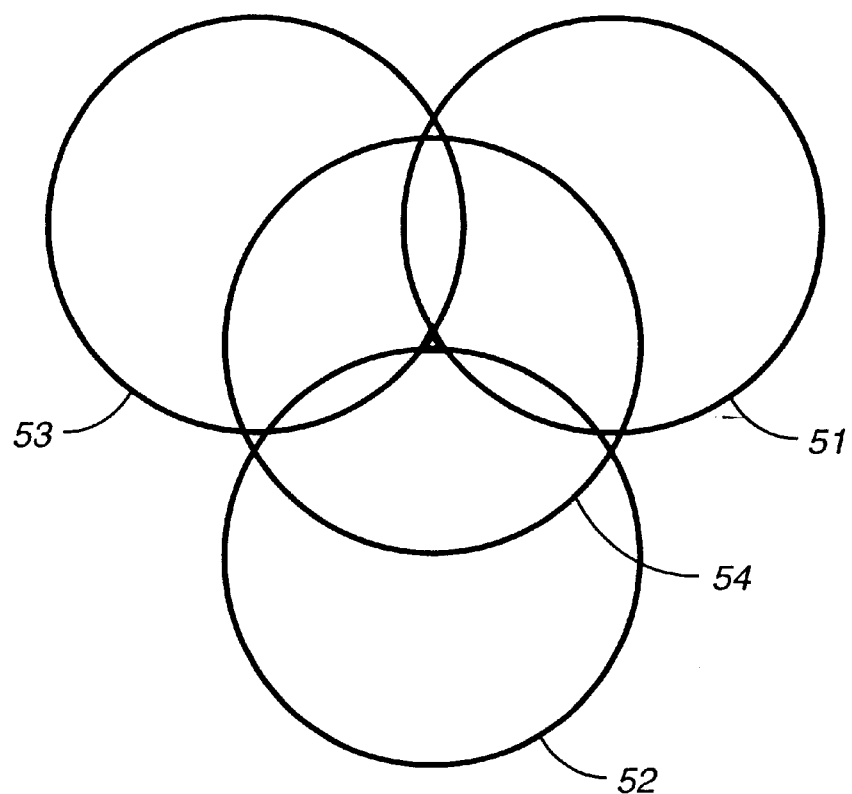
FIG. 3 shows the pattern of coverage for the antenna assembly.

On each face, one antenna is duplexed Tx/Rx1 while the second antenna is Rx2 (not duplexed). The center omni-directional antennas are also Tx/Rx1 and Rx2. This arrangement of antennas creates a conventional three sectored coverage pattern for the base station 10 as shown in FIG. 3 wherein the pattern of each pair of receive and transmit antennas defines a different coverage area. The coverage pattern for the first transceiver 31 is represented by circle 51 projecting from the triangular tower structure, whereas the coverage pattern for the second transceiver 32 is depicted by circle 52. The third transceiver's 33 coverage pattern is represented by circle 53. The coverage patterns overlap one another slightly so as to provide a continuous coverage area in proximity to the base station location. The fourth transceiver 34 and its associated antennas 37 and 43 form an omni-directional pattern 54 which is centered at the base station location overlapping each of the three sectors 51–53. Although the omni-directional pattern 54 is illustrated as being circular, other substantially omni-directional shapes may be utilized. Thus the coverage pattern 54 associated with the fourth transceiver 34 overlays the patterns 51–53 of the conventional tri-sector/tri-cell broadband multi-carrier base station. The radio frequency channels and voice/data channels of the omni-directional overlay pattern 54 are allocated as needed to increase traffic in any of the three operating sectors. Upon a malfunction and shut down of the equipment associated with any of the three sectors denoted by patterns 51, 52 and 53, the omni-directional cell with pattern 54 will typically be detected by the mobile subscriber terminal 44 as the next-best alternative cell. So it will provide coverage until the off-line sector equipment is brought back on-line.

The overall system reliability of the redundant overlay approach is better than the alternative approach of RF switching three sectors into four transceivers and high power amplifiers. The present approach requires only four RF transceivers 31–34 and power amplifiers 28, 38, 39 and 40 for non-switch redundancy which would otherwise require six sets of transceivers and amplifiers for parallel redundancy of the three sectors. The fourth transceiver 34 and power amplifier 40 are always in-use with the present system, providing improvements in the base transceiver station Erlang usage. If desired the omni-directional overlay pattern 54 maybe used with a different radio frequency band to allow for more efficient frequency re-use patterns. In addition to transceiver and high power amplifier redundancy, the omni-directional overlay also provides redundancy in other base station equipment, including antennas, cables and filters. The omni-directional overlay may also be used to provide backhaul communication with a remotely located translating repeater.

What is claimed is:

1. A base station for wireless communication comprising:
 a plurality of broadband transceivers for receiving and transmitting radio frequency signals;
 a plurality of antenna arrays, each said antenna array connected to a different one of the plurality of broadband transceivers and having a coverage pattern extending in a different direction from the base station;
 an overlay antenna having a coverage area extending in substantially an omni-directional pattern from the base station, thereby continuously overlapping coverage patterns from all of the plurality of antenna arrays; and
 an overlay broadband transceiver continuously coupled to the overlay antenna for receiving and transmitting signals on a radio frequency, wherein the overlay antenna and the overlay broadband transceiver continuously provides a redundant communication link in the event of a malfunction of at least one of the plurality of broadband transceivers and continuously provides an added traffic capacity to areas served by said plurality of antenna arrays and said broadband transceivers.

2. The base station as recited in claim 1, further comprising a plurality of high power multi-carrier amplifiers, each one coupling one of the plurality of broadband transceivers to one of the plurality of antenna arrays; and wherein the overlay broadband transceiver also provides a redundant communication link in the event of a malfunction of at least one of the plurality of high power multi-carrier amplifiers.

3. The base station as recited in claim 2, further comprising an overlay high power multi-carrier amplifier coupling the overlay broadband transceiver to the overlay antenna array.

4. A base station for wireless communication comprising:
- first, second, and third antennas arranged in a triangular configuration thereby producing three coverage areas;
- first, second, and third broadband transceivers for receiving and transmitting radio frequency signals;
- first, second, and third high power multi-carrier amplifiers with the first high power multi-carrier amplifier coupling the first broadband transceiver to the first antenna, the second high power multi-carrier amplifier coupling the second broadband transceiver to the second antenna, and the third high power multi-carrier amplifier coupling the third broadband transceiver to the third antenna;
- a fourth antenna having a coverage area extending in substantially an omni-directional pattern from the base station, thereby overlapping coverage patterns of the first, second, and third antennas;
- a fourth broadband transceiver for receiving and transmitting signals on a radio frequency; and
- a fourth high power multi-carrier amplifier coupling the fourth broadband transceiver to the fourth antenna, wherein the overlay antenna and the fourth broadband transceiver provide redundant communication in the event of a malfunction of one of the first, second, and third broadband transceivers and in the event of a malfunction of one of the first, second, and third high power multi-carrier amplifiers.

* * * * *